(12) United States Patent
Agee

(10) Patent No.: US 11,565,227 B2
(45) Date of Patent: Jan. 31, 2023

(54) HEAT TRANSFER ELEMENTS

(71) Applicant: Emerging Fuels Technology, Inc., Tulsa, OK (US)

(72) Inventor: Kenneth L. Agee, Tulsa, OK (US)

(73) Assignee: EMERGING FUELS TECHNOLOGY, INC., Tulsa, OK (US)

(*) Notice: Subject to any disclaimer, the term of this patent is extended or adjusted under 35 U.S.C. 154(b) by 141 days.

(21) Appl. No.: 17/159,949

(22) Filed: Jan. 27, 2021

(65) Prior Publication Data

US 2022/0234017 A1 Jul. 28, 2022

(51) Int. Cl.
*B01J 8/06* (2006.01)

(52) U.S. Cl.
CPC ........ *B01J 8/06* (2013.01); *B01J 2208/00132* (2013.01)

(58) Field of Classification Search
CPC ............... B01J 8/06; B01J 2208/00132; B01J 2208/0015; B01J 2208/00159
See application file for complete search history.

(56) References Cited

U.S. PATENT DOCUMENTS

| | | | |
|---|---|---|---|
| 2,198,555 A * | 4/1940 | Wilson | B01J 8/06 422/658 |
| 4,190,105 A * | 2/1980 | Dankowski | F25B 49/027 165/DIG. 536 |
| 7,132,555 B2 | 11/2006 | Te Raa et al. | |
| 7,608,344 B2 | 10/2009 | Abbott, III et al. | |
| 8,088,344 B2 | 1/2012 | Te Raa et al. | |
| 8,354,040 B1 | 1/2013 | Kenar | |
| 8,420,023 B2 | 4/2013 | Tatarchuk et al. | |
| 8,722,747 B2 | 5/2014 | Gamlin et al. | |
| 8,802,903 B2 | 8/2014 | Weiner et al. | |
| 8,906,970 B2 | 12/2014 | Gamlin | |
| 9,011,788 B2 | 4/2015 | Hartvigsen et al. | |
| 9,012,358 B2 | 4/2015 | Gamlin et al. | |
| 9,157,689 B2 | 10/2015 | Hartvigsen | |
| 9,890,333 B2 | 2/2018 | Groppi et al. | |
| 10,011,776 B2 | 7/2018 | Paturzo et al. | |
| 10,434,484 B1 | 10/2019 | Agee | |
| 10,821,415 B2 | 11/2020 | Whittenberger et al. | |
| 2018/0015408 A1 | 1/2018 | Yu et al. | |
| 2019/0284479 A1 | 9/2019 | Steynberg et al. | |

FOREIGN PATENT DOCUMENTS

EP   1326706 B1   7/2004
KR   10-1352833 B1   1/2014

OTHER PUBLICATIONS

International Search Report and Written Opinion International PCT Application No. PCT/US2022/012711, Korean Intellectual Property Office, dated May 4, 2022.

* cited by examiner

*Primary Examiner* — Lessanework Seifu
(74) *Attorney, Agent, or Firm* — Head, Johnson, Kachigian & Wilkinson PC

(57) ABSTRACT

A method for enhancing the heat transfer performance of a vertical tubular reactor by adding heat transfer elements inside the reactor tubes. Such heat transfer elements have two or more substantially curved legs of equal length with no cross fins, each with a foot that engages the inside wall of the tube, and can optionally have two or more substantially curved sub-legs that do not engage the wall of the tube.

12 Claims, 4 Drawing Sheets

HEAT TRANSFER ELEMENTS

CROSS REFERENCE

Not Applicable.

BACKGROUND OF THE INVENTION

Field of the Invention

This invention relates generally to enhancing heat transfer in a catalyst/reactor system for exothermic catalytic reactions, particularly Fischer Tropsch and related reactions.

Description of the Related Art

Exothermic chemical reactions require excellent heat transfer to maintain the reaction within a targeted temperature range, especially in a commercial process unit, such as in chemical plants or petroleum refineries where great amounts of heat need to be transferred. An example of an exothermic chemical reaction is the Fischer Tropsch reaction. While many exothermic reactions may be conducted in the reactor of the present invention, the invention is described as a Fischer Tropsch reactor.

Various processes are known for the conversion of carbonaceous feeds or light hydrocarbon containing gases into normally liquid products, such as methanol, higher alcohols, and hydrocarbon fuels and chemicals, particularly paraffinic hydrocarbons. Such processes are directed at the objective of adding value to the feedstock by making a transportable, more valuable product, such as diesel fuel or jet fuel or chemicals such as base oils or drilling fluids.

The Fischer Tropsch process can be used to convert such feedstocks into more valuable, easily transportable liquid hydrocarbon products and chemicals. The feedstock is first converted to synthesis gas comprising carbon monoxide and hydrogen. The synthesis gas is then converted to heavy hydrocarbon products using a Fischer Tropsch catalyst. The heavy hydrocarbon products can be subjected to further workup by hydroprocessing, such as hydrocracking and/or hydroisomerization and distillation, resulting in, for example, a high yield of high-quality middle distillate products such as jet fuel or diesel fuel. The heavy hydrocarbon products can also be upgraded to specialty products such as solvents, drilling fluids, waxes, or lube base oils, due to the high purity of the Fischer Tropsch products.

Processes that convert light hydrocarbons to heavier hydrocarbon products for example generally have three steps:
1. conversion of a carbonaceous feedstock such as natural gas, coal, petroleum coke, heavy oils, biomass, landfill gas, biogas, and municipal waste into synthesis gas comprising carbon monoxide and hydrogen;
2. conversion of the synthesis gas to heavy hydrocarbons via the Fischer Tropsch reaction; and
3. hydroprocessing the heavy hydrocarbon product to yield one or more finished hydrocarbon products.

The design of a Fischer Tropsch reactor is of paramount importance for the technical and economic success of a plant comprising the conversion of synthesis gas into hydrocarbons. The reactor may be a fluidized bed, slurry bubble column, or fixed bed reactor. Several different fixed bed reactor designs have been used for the Fischer Tropsch reaction, such as lamella plate, double tube, micro channel, and vertical tubular fixed bed. The improved reactor of the present invention is a vertical tubular fixed bed reactor equipped with heat transfer element inserts inside the tubes.

The reactor needs to meet many conditions and process requirements such as minimum complexity, ease of construction, reliability, and low risk scalability. Vertical tubular reactors have been demonstrated to be very reliable and easily scalable in commercial plants around the world. However, tubular reactors are heat transfer limited. This limitation can be improved by using smaller diameter tubes, but smaller tubes add weight, complexity and cost to the reactor fabrication. It is an objective of the present invention to facilitate the use of larger tubes that will have heat removal capacity equal to or better than the same reactor capacity with smaller tubes. It is a further objective of the present invention to retrofit an existing reactor with heat transfer elements of the present invention so that the heat transfer capacity of the reactor is substantially increased.

SUMMARY OF THE INVENTION

In general, in a first aspect, the invention relates to a process for conducting an exothermic reaction in a vertical tubular reactor, containing multiple tubes attached to common tube sheets at top and bottom, each tube containing heat transfer elements with two or more legs of equal length, each having a substantially curved shape and some or all of the legs of the heat transfer element that are in thermal contact with the inner tube wall.

It is desirable to operate the reactor of the present invention at high throughput and high catalyst productivity. Productivity relates to volumes of reactant gases converted per volume of catalyst per unit time. High catalyst productivity requires high capacity to remove the heat generated by the exothermic reaction. One approach to solve this problem has been to use small diameter reactor tubes which have a high ratio of surface area to catalyst volume. However, using small tubes requires a large number of tubes which adds complexity and increases reactor weight and cost. It is desirable to use large diameter tubes which make it easier to load catalyst while reducing reactor weight and cost. The heat transfer elements of the present invention make it possible to use larger tubes and operate at relatively high catalyst productivity compared to what would be possible without the heat transfer elements of the present invention. Heat transfer elements as described herein may increase the heat removal capacity measured as the overall heat transfer rate by a factor of two or three or more times what it would be for the same tube without these heat transfer elements. The heat transfer elements described herein with two or more legs that are substantially curved and at least two legs that have a foot to engage the inside wall of the tube can be installed with a moderate force as the curved legs have some flexibility to account for minor variations in the tube inside diameter and imperfect roundness. The heat transfer elements described herein are pressed into the tubes and make thermal contact by compression of the legs with no brazing, welding, gluing, or any other bonding method. The substantial curve of the legs also make it possible to adjust the outside dimensions of the heat transfer elements to customize the fit in the tubes and finally the heat transfer elements described herein can be any length but the preferred length is between three and fifty tube inside diameters to assure minimum drag as the heat transfer elements are pressed into the tube in sequential, end to end fashion filling the interior of the tube in the reaction zone which will be filled with catalyst, such catalyst filling the voids between the legs of the heat transfer elements and the tube inner wall.

Figure 1:
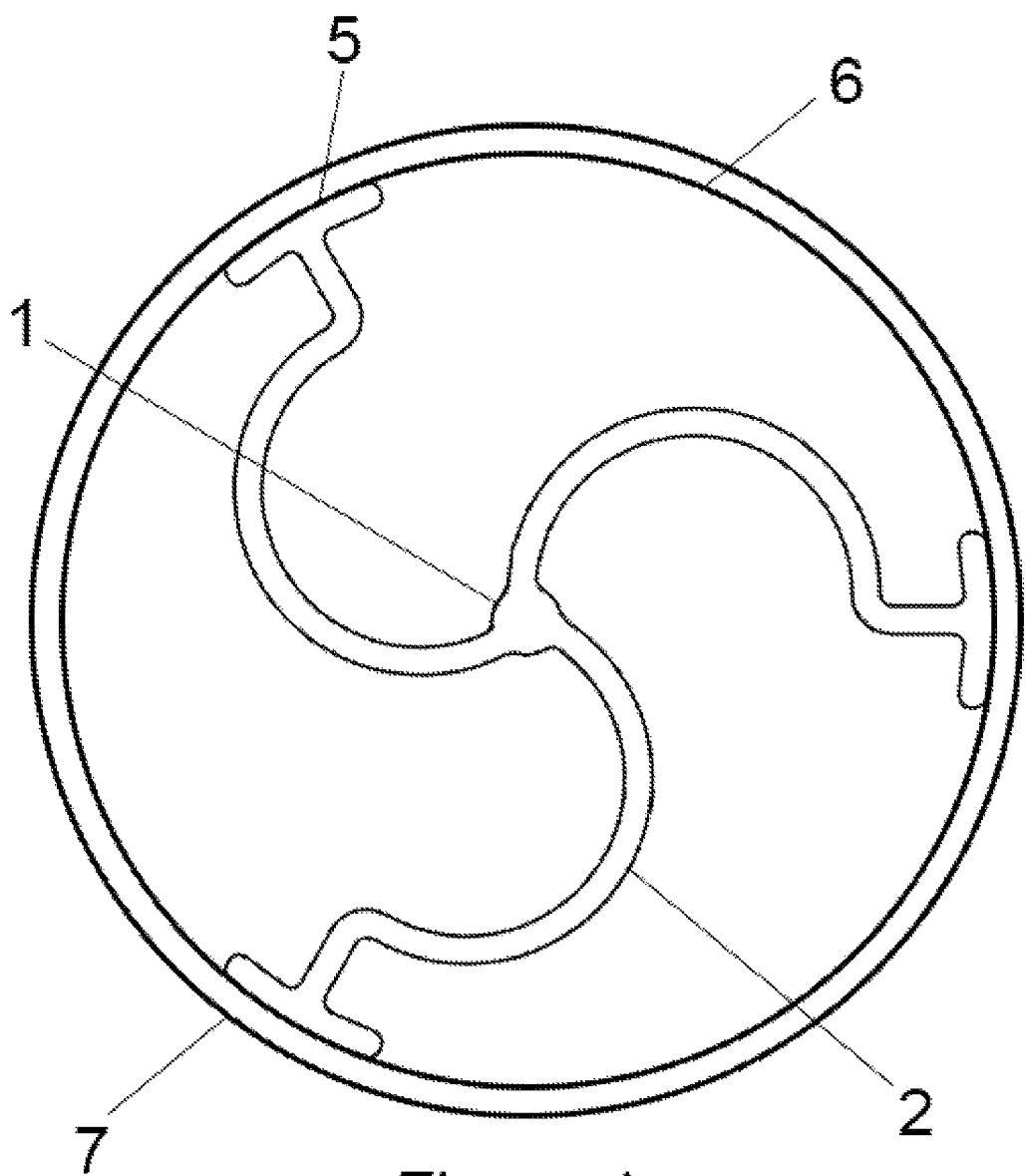
FIG. 1 is a cross-sectional view of a preferred heat transfer element of the present invention with three legs.
Figure 2:
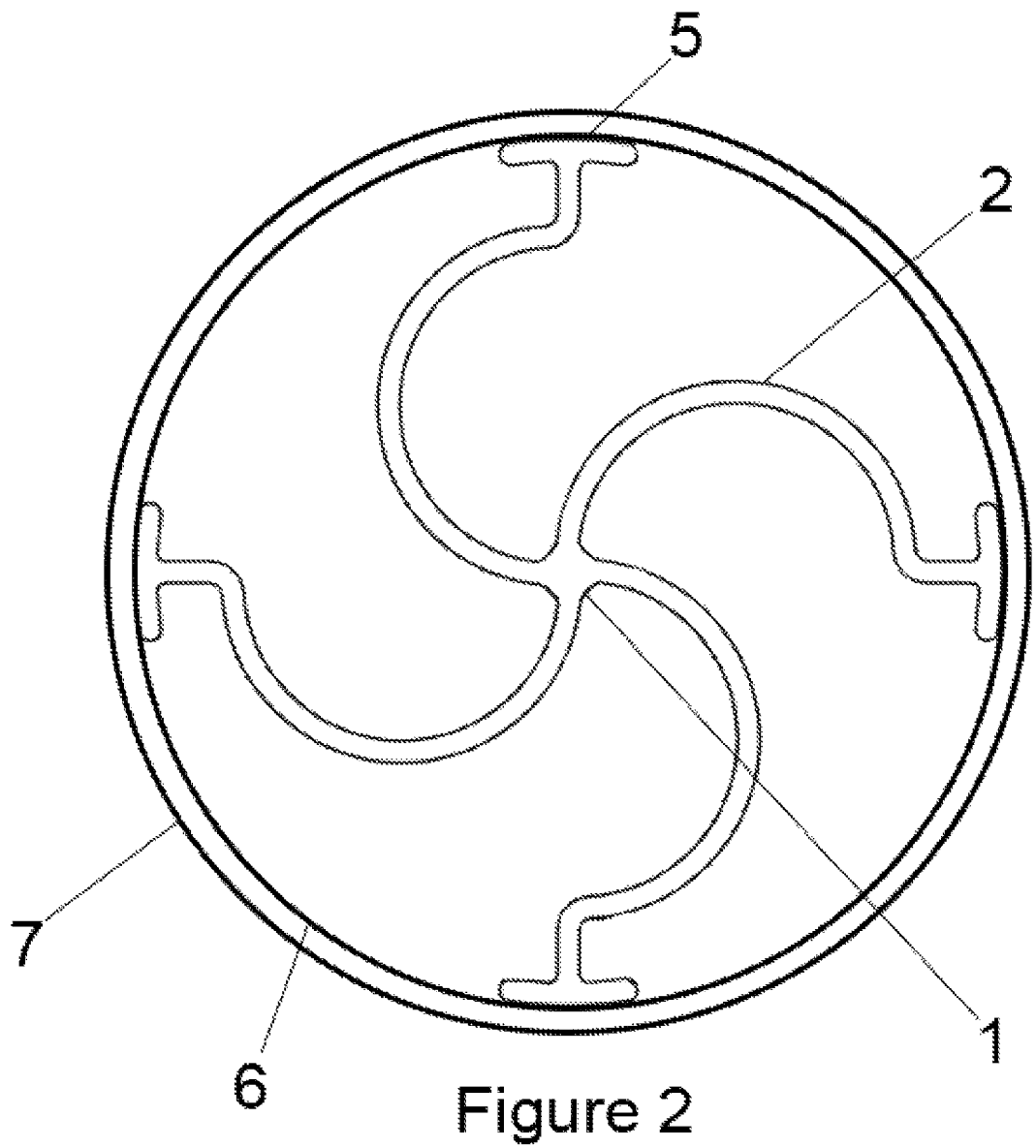
FIG. 2 is a cross-sectional view of a preferred heat transfer element of the present invention with four legs.
Figure 3:
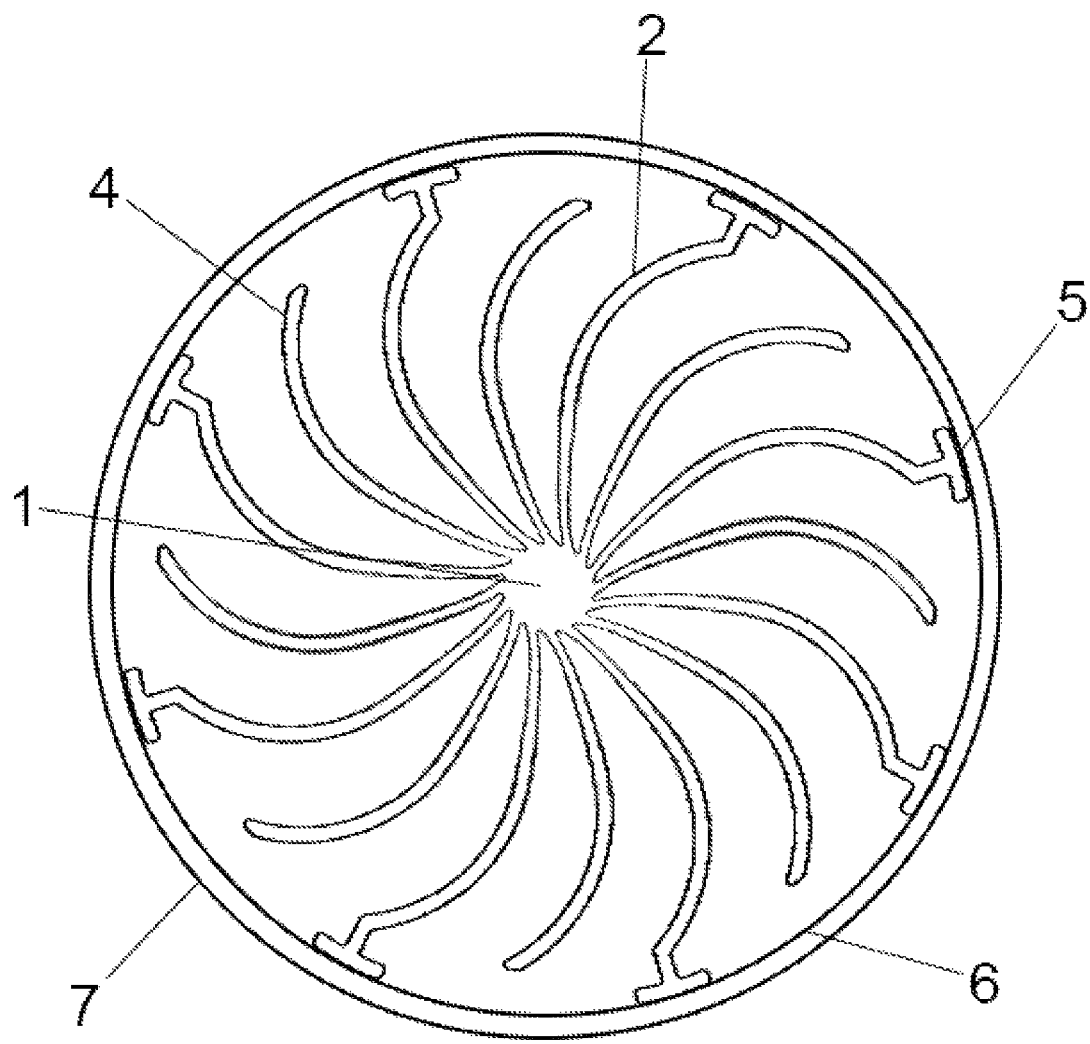
FIG. 3 is a cross-sectional view of a preferred heat transfer element of the present invention with eight legs and eight sub-legs.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a heat transfer element 1 with substantially curved legs 2 to improve heat transfer in a vertical tubular fixed bed reactor 3. The heat transfer elements may have two or more legs 2 and any number of sub-legs 4 wherein at least two of the legs 2 have a foot 5 and make substantial contact with the inner wall 6 of the tubes 7 in a vertical tubular reactor 3.

Heat transfer elements 1 of the present invention may have two or more legs 2 that have a substantial curve. The heat transfer element 1 may have at least two legs 2 of equal length that extend to the inside tube wall 6 with a foot 5 to engage the inside wall 6 of the tube 7. If a heat transfer element 1 has more than two legs 2, it may optionally have some number of sub-legs 4 that extend from the center 8 of the heat transfer element 1 to near the inside wall 6 but do not necessarily touch the inside wall 6 of the tube or have a foot.

Heat transfer elements 1 of the present invention may serve to be super conductors to transfer heat of reaction from the interior of the tube 7 to the tube wall 6, which may be cooled by fluid on the outside of the tube 7. Heat transfer element legs 2 that touch the inside wall 6 of the tube 7 may be required to better conduct the heat and therefore it may be desirable that a substantial portion of the legs 2 have a foot 5 and are in intimate thermal contact with the tube wall 6. Substantial thermal contact with the wall 6 may create a restriction to pressing the heat transfer elements 1 into the tube 7 and therefore the legs 2 of the heat transfer elements 1 of the present invention may have a substantial curved shape. This curved shape may give the heat transfer element 1 more flexibility during installation. It may also increase the surface area of each leg 2 relative to a similar heat transfer element with straight legs. The curved legs 2 may not have cross fins, which stiffen the leg, defeating the purpose of the curved design of the present invention for flexibility during installation. Fins are also not desirable because they make catalyst bridging more likely, which creates catalyst voids resulting in uneven pressure drop through the tubes.

The substantially curved legs 2 of the heat transfer elements 1 of the present invention may also make it possible to modify the heat transfer elements 1 slightly during installation if the inside diameter dimensions of the tube 7 are slightly different than the heat transfer elements 1 were designed for. This may be true if the tube diameters are not consistent from the manufacturer or if the heat transfer elements 1 are being installed in an existing older reactor as part of a renovation. In this case, the curved shape makes it possible to push the heat transfer elements 1 through a shaped die to slightly expand or contract them to better fit the actual tube dimensions found in the reactor 3. If the legs 2 of the heat transfer elements 1 were straight, this would not be possible.

The heat transfer elements 1 of the present invention may be fabricated from sheets of any metal known to one skilled in the art or they may be extruded using aluminum or copper. Aluminum and copper have much higher thermal conductivity and are much preferred material for the heat transfer elements 1 described herein. The heat transfer element 1 of the present invention is characterized by having two or more curved legs 2 of equal length with no cross fins, each leg 2 with a foot 5 designed to engage the inner tube wall 6. Such heat transfer elements 1 may have any number of legs from 2 to 10 or more. Each leg 2 may have a substantial curve, none of which may comprise the shortest distance between one end of the leg 2, which may be centered in the tube 7, and the other end of the leg 2. None of the legs 2 of the heat transfer element 1 described herein may have a cross fin.

Figure 4:
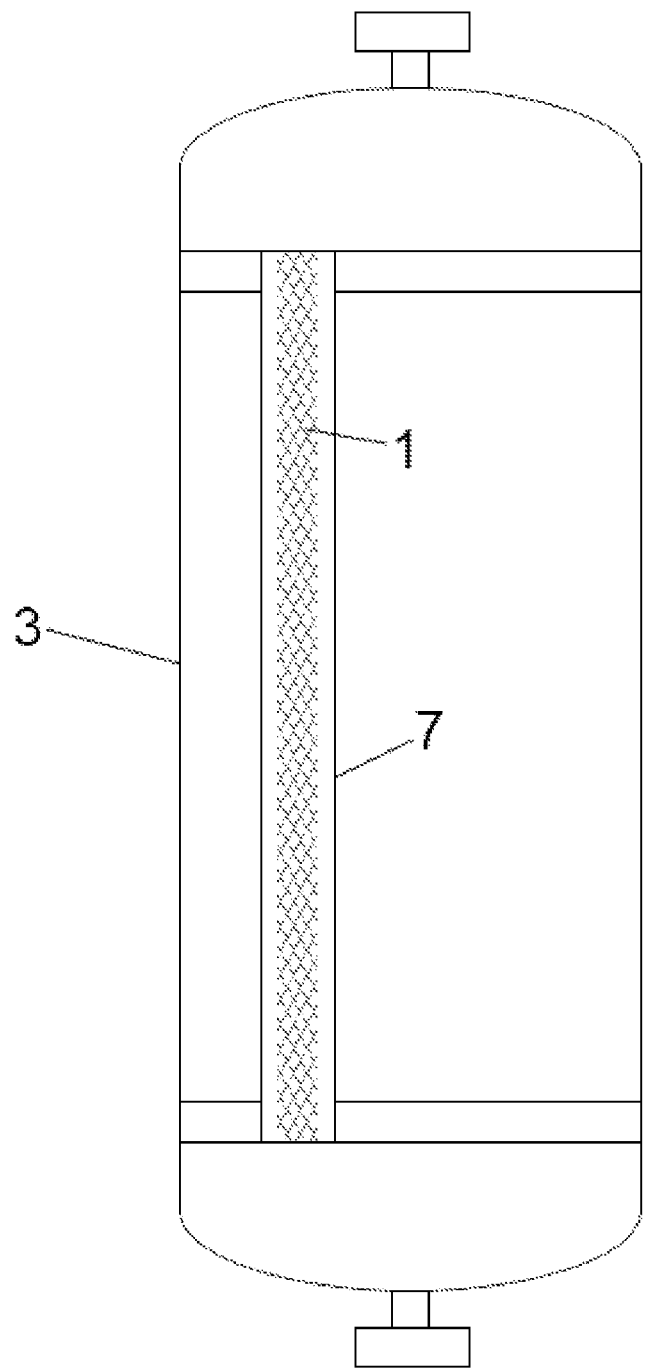
FIG. 4 is a cross-sectional view of a vertical tubular reactor of the present invention showing a single tube for ease of description.

The heat transfer elements 1 of the present invention may be installed with relative ease in tubes 7 of a vertical tubular reactor 3, shown in FIG. 4, resulting in significant improvement in the heat transfer performance of the reactor 3. Vertical tubular reactors 3 as described herein may have a tube sheet at the top and the bottom. The tube sheets may be drilled and tubes 7 may be attached which may go through the tube sheets. The tubes 7 may be mechanically rolled into the tube sheets or welded or a combination so that they are sealed to the tube sheets. The tube sheets may have a shell between them that encloses all the tubes 7. The reactor 3 may also have heads on top and on bottom. The heads may allow for reactant gases to enter the top head such that the gases pass through the tubes 7 and enter the bottom head from which they exit the reactor. The shell side may be sealed and separated from the tubes 7, which may allow for a cooling fluid to pass through it to cool the outside of the tubes 7, removing the heat generated by reaction in the tubes 7. When used as a reactor, catalyst may be packed in the tubes 7 so that reactant gases that enter the top head pass through the catalyst-packed tubes 7 to the bottom head and then exit the reactor. Normally, hot oil or water or boiling water or any fluid know to one skilled in the art may be passed through the shell side of the reactor to remove the heat generated by the reaction in the tubes 7. Controlling the temperature inside the tubes 7 may be limited by the heat removal capacity of the tubes 7, which may be affected by many different factors including the diameter of the tube 7, the velocity of the gases passing through the tube 7, the particle size of the catalyst, and the thermal conductivity of the catalyst packed in the tubes 7. By adding heat transfer elements in the tubes 7 and filling the voids with catalyst, the thermal conductivity of the bed may be greatly enhanced over what it would be for the catalyst only. For descriptive purposes, FIG. 4 shows a single tube 7 and the hatched portion represents heat transfer elements that run down the full length of the tube 7. The reactor 3 of FIG. 4 may be filled with hundreds or even thousands of other tubes 7, each configured with heat transfer elements 1. The heat transfer elements therefore can greatly increase the capacity of the reactor by increasing its capacity for removing the heat generated by the reaction. More efficient removal of heat may make it possible to construct the reactor with less catalyst volume to achieve the same level of production or in the same reactor of fixed catalyst volume to achieve a greater level of production. The heat transfer elements 1 of the present invention may occupy a minor portion of the volume inside the tube 7 so that the majority of the volume is filled with catalyst.

It has been found in practice that the addition of the heat transfer elements 1 can be a very difficult job. The degree of heat transfer performance improvement that can be achieved with the addition of heat transfer elements 1 is related to how well they fit in the tubes 7. If the heat transfer elements are loose and only occasionally touch the tube wall 6, they are easy to install but the heat transfer performance suffers. If the heat transfer elements 1 fit tight, heat transfer is improved but they can be very difficult to insert in the tubes 7. Commercial tubes 7 have variations in wall thickness and tube roundness. Heat transfer elements, regardless of how they are manufactured, have similar variations. These variations may be a few thousandths of an inch, but they are real and they have a big impact on installation of the heat transfer elements. It has been found that if the legs 2 of the heat transfer elements 1 each have a substantial curve, they can be more easily installed in the tubes 7. The preferred embodiment of the present invention has three or four or more legs 2 each with a substantial curve and no cross fins. Cross fins stiffen the legs 2 and cause catalyst bridging, which is undesirable. With a substantial curve, the legs 2 have a little flexibility to flex a few thousands of an inch as needed to accommodate the variations of the tube thickness and roundness and still make good contact with the tube wall 6. It has also been found that when retrofitting an existing reactor, tube dimensions may not be the same as the fabrication data sheet, which could cause a major installation problem. However, this can be resolved with the heat transfer elements 1 of the present invention that have legs 2 with a substantial curve with some flexibility making it easier to install or if needed that can be slightly modified in the field during installation.

When retrofitting an existing reactor 3, the heads may limit the length of a single heat transfer element 1 that can be installed. It has also been found in practice that shorter segments of the heat transfer elements 1 can be more easily installed. It is therefore preferred to cut the heat transfer elements 1 so that a fixed number inserted into the tubes 7 results in a continuous column of heat transfer elements 1 that fills the length of the tube 7. This may require 10 or 20 or even 30 separate heat transfer elements 1 for every tube 7, or any number of separate heat transfer elements 1 required to fill the length of the tube 7. If, for example, a reactor has 5,000 tubes 7 and requires 20 heat transfer elements 1 for each tube, then 100,000 separate heat transfer elements 1 may need to be inserted and pressed into the tubes 7. This may be done with tools to guide the heat transfer elements 1 to maintain the same orientation so that catalyst and thermocouples can be easily added and push tools may be used to push the heat transfer elements 1 into the correct position from the bottom of the tube 7 to the top. A guide, for example, may be a semi-rigid device that is substantially the length of the tube 7. The guide may be inserted into the tube 7 before installing heat transfer elements 1 and may be shaped so that two legs 2 of the heat transfer element 1 fit around the guide as they are pushed into the tube 7. The heat transfer elements 1 may be inserted into the tube 7 and pushed into place sequentially from the bottom of the tube 7 to the top, end to end. After installing all of the heat transfer elements 1 into a tube 7, the guide may be removed and can be used in another tube 7. With the guide, the orientation of the heat transfer elements may be kept the same down the length of the tube 7, making it easier to install thermocouples and add catalyst. This is a labor-intensive job and if the heat transfer elements 1 do not fit well it can be nearly impossible. However, it has been found that the heat transfer elements 1 of the present invention with substantially curved legs 2 have some flexibility, making it possible to install them properly, and if the dimensions are not correct, the heat transfer elements 1 with curved legs 2 can be adjusted by pressing them through a die to adjust the leg position slightly to make the outside dimension of the heat transfer element 1 slightly smaller or slightly greater as needed to properly fit the tubes 7 as required. The heat transfer elements 1 can be made to be any length but it is generally preferred to cut them to a length on the order of three to fifty times the diameter of the heat transfer element 1 and such that the length of the tube 7 divided by the length of the heat transfer element 1 is an integer.

Whereas, the devices and methods have been described in relation to the drawings and claims, it should be understood that other and further modifications, apart from those shown or suggested herein, may be made within the spirit and scope of this invention.

What is claimed is:

1. A method to increase heat transfer capacity in a vertical tubular reactor comprising at least one tube, the method comprising:
    inserting at least one heat transfer element into each tube of the vertical tubular reactor, wherein each heat transfer element comprises two or more legs of equal length that are curved and do not have cross fins and where each leg terminates in a foot in thermal contact with an inside wall of the tube, wherein inserting the at least one heat transfer element into the tube comprises:
        inserting a semi-rigid guide tool into the tube before installing the at least one heat transfer element;
        removing the guide after installing the heat transfer elements; and
        optionally reusing the guide multiple times,
    where the guide is capable of fitting between two of the legs of the heat transfer element, such that as the heat transfer elements are inserted into the tube and pushed into place, the heat transfer elements fit over the guide and are pushed into the tube sequentially end to end, filling the tube, while the guide assures that the heat transfer elements stay in a fixed orientation.

2. The method of claim 1 wherein inserting the at least one heat transfer element into the tube comprises pressing the heat transfer element into the tube with no brazing, welding, glue, or other bonding agent.

3. The method of claim 1 further comprising cutting the heat transfer element to a length that is between three and fifty times the outside diameter of the heat transfer element such that the length of the tube intended for receiving the heat transfer elements divided by the length of a single heat transfer element is an integer.

4. The method of claim 1 wherein the heat transfer elements are fabricated from sheets of any metal or extruded from aluminum or copper.

5. A method to increase heat transfer capacity in a vertical tubular reactor, the method comprising:
- inserting at least one heat transfer element into each tube of the vertical tubular reactor, wherein:
  - each heat transfer element comprises two or more legs of equal length that are curved and do not have cross fins and where each leg terminates in a foot in thermal contact with an inside wall of the tube; and
  - each heat transfer element further comprises two or more sub-legs that are curved and do not have cross fins and do not touch the inside wall of the tube.

6. The method of claim 5 wherein inserting the at least one heat transfer element into the tube comprises pressing the heat transfer element into the tube with no brazing, welding, glue, or other bonding agent.

7. The method of claim 5 further comprising cutting the heat transfer element to a length that is between three and fifty times the outside diameter of the heat transfer element such that the length of the tube intended for receiving the heat transfer elements divided by the length of a single heat transfer element is an integer.

8. The method of claim 5 wherein the heat transfer elements are fabricated from sheets of any metal or extruded from aluminum or copper.

9. A method to increase heat transfer capacity in a vertical tubular reactor, the method comprising:
- inserting at least one heat transfer element into each tube of the vertical tubular reactor, wherein each heat transfer element comprises two or more legs of equal length that are curved and do not have cross fins and where each leg terminates in a foot in thermal contact with an inside wall of the tube; and
- adjusting the outer dimensions of the heat transfer element to adjust the fit when inserted into the tube, where adjusting the outer dimensions of the heat transfer element comprises pressing the heat transfer element through a die to compress or expand the heat transfer element.

10. The method of claim 9 wherein inserting the at least one heat transfer element into the tube comprises pressing the heat transfer element into the tube with no brazing, welding, glue, or other bonding agent.

11. The method of claim 9 further comprising cutting the heat transfer element to a length that is between three and fifty times the outside diameter of the heat transfer element such that the length of the tube intended for receiving the heat transfer elements divided by the length of a single heat transfer element is an integer.

12. The method of claim 9 wherein the heat transfer elements are fabricated from sheets of any metal or extruded from aluminum or copper.

* * * * *